US008145482B2

(12) United States Patent
Daya et al.

(10) Patent No.: US 8,145,482 B2
(45) Date of Patent: Mar. 27, 2012

(54) ENHANCING ANALYSIS OF TEST KEY PHRASES FROM ACOUSTIC SOURCES WITH KEY PHRASE TRAINING MODELS

(76) Inventors: Ezra Daya, Petah-Tiqwa (IL); Oren Pereg, Zikhron Ya'akov (IL); Yuval Lubowich, Raanana (IL); Moshe Wasserblat, Maccabim (IL)

(*) Notice: Subject to any disclaimer, the term of this patent is extended or adjusted under 35 U.S.C. 154(b) by 962 days.

(21) Appl. No.: 12/126,884

(22) Filed: May 25, 2008

(65) Prior Publication Data

US 2009/0292541 A1 Nov. 26, 2009

(51) Int. Cl.
*G10L 15/06* (2006.01)
*G10L 15/18* (2006.01)

(52) U.S. Cl. ......... 704/236; 704/243; 704/251; 704/270

(58) Field of Classification Search ........... 704/236, 704/243, 251, 257, 270
See application file for complete search history.

(56) References Cited

U.S. PATENT DOCUMENTS

| | | | | |
|---|---|---|---|---|
| 6,098,034 A * | 8/2000 | Razin et al. | | 704/9 |
| 6,104,990 A * | 8/2000 | Chaney et al. | | 704/9 |
| 6,243,676 B1 * | 6/2001 | Witteman | | 704/251 |
| 6,473,730 B1 * | 10/2002 | McKeown et al. | | 704/9 |
| 7,139,698 B1 * | 11/2006 | Gorin et al. | | 704/10 |
| 7,272,558 B1 * | 9/2007 | Soucy et al. | | 704/235 |
| 7,606,856 B2 * | 10/2009 | Singh et al. | | 709/202 |
| 7,716,048 B2 * | 5/2010 | Pereg et al. | | 704/246 |
| 7,725,318 B2 * | 5/2010 | Gavalda et al. | | 704/251 |
| 7,822,605 B2 * | 10/2010 | Zigel et al. | | 704/246 |
| 7,870,118 B2 * | 1/2011 | Jiang et al. | | 707/706 |
| 7,885,948 B2 * | 2/2011 | Johnson et al. | | 707/705 |
| 8,005,675 B2 * | 8/2011 | Wasserblat et al. | | 704/252 |
| 8,078,463 B2 * | 12/2011 | Wasserblat et al. | | 704/246 |
| 2002/0082833 A1 * | 6/2002 | Marasek et al. | | 704/251 |
| 2003/0204399 A1 * | 10/2003 | Wolf et al. | | 704/251 |
| 2004/0044952 A1 * | 3/2004 | Jiang et al. | | 715/500 |
| 2004/0122657 A1 * | 6/2004 | Brants et al. | | 704/9 |
| 2005/0114130 A1 * | 5/2005 | Java et al. | | 704/240 |
| 2006/0212295 A1 * | 9/2006 | Wasserblat et al. | | 704/252 |
| 2007/0150426 A1 * | 6/2007 | Asher et al. | | 706/20 |
| 2008/0040110 A1 * | 2/2008 | Pereg et al. | | 704/236 |
| 2008/0154609 A1 * | 6/2008 | Wasserblat et al. | | 704/273 |
| 2008/0181417 A1 * | 7/2008 | Pereg et al. | | 381/17 |
| 2009/0070312 A1 * | 3/2009 | Patterson | | 707/5 |
| 2010/0088323 A1 * | 4/2010 | Ashkenazi et al. | | 707/752 |

OTHER PUBLICATIONS

Abe et al., "Detecting temporal patterns of technical phrases by using importance indices in a research documents", IEEE International Conference on Systems, Man and Cybernetics, 2009, Oct. 11, 2009 to Oct. 14, 2009, pp. 2959 to 2964.*

* cited by examiner

*Primary Examiner* — Martin Lerner
(74) *Attorney, Agent, or Firm* — Soroker Agmon

(57) ABSTRACT

Methods and apparatus for the enhancement of speech to text engines, by providing indications to the correctness of the found words, based on additional sources besides the internal indication provided by the STT engine. The enhanced indications comprise sources of data such as acoustic features, CTI features, phonetic search and others. The apparatus and methods also enable the detection of important or significant keywords found in audio files, thus enabling more efficient usages, such as further processing or transfer of interactions to relevant agents, escalation of issues, or the like. The methods and apparatus employ a training phase in which word model and key phrase model are generated for determining an enhanced correctness indication for a word and an enhanced importance indication for a key phrase, based on the additional features.

16 Claims, 6 Drawing Sheets

ENHANCING ANALYSIS OF TEST KEY PHRASES FROM ACOUSTIC SOURCES WITH KEY PHRASE TRAINING MODELS

TECHNICAL FIELD

The present disclosure relates to speech recognition in general, and to a method and apparatus for enhancing the accuracy and reducing errors in speech to text systems, in particular.

BACKGROUND

Speech recognition, sometimes referred to as automatic speech recognition, computer speech recognition, speech to text, and others, converts spoken words and word sequences into machine-readable data. Speech recognition can take a number of forms. One form relates to free speech recognition, in which it is required to transcribe spoken text from audio stream or file, by one or more speakers, whether any of the speakers is known or not. Free speech recognition is used in applications such as dictation, preparation of structured documents, such as radiology reports, and others. Another form relates to word spotting, in which predetermined words are searched for in audio sources such as files or streams, for applications such as voice dialing, voice-activation of devices, or the like.

However, speech recognition systems provide neither a hundred percent recall, i.e., not all words that were actually spoken are found, nor hundred percent precision, i.e., not all words allegedly found in the audio were indeed spoken.

The quality of the text has significant impact on its usability. In dictation applications, the higher the quality, the less manual work is required. In automatic applications wherein manual supervision is not available, the quality of the text influences the analysis and conclusions that can be deduced from the text.

Some speech recognition engines provide a certainty score for each found word, i.e. an indicator to the confidence degree assigned by the engine to the spotted or transcribed word. Yet, even the certainty score does not provide accurate indication to the quality of the results, so simply ignoring results having relatively low certainty score may indeed remove erroneous words, but may also remove correct words thus reducing the recall percentage.

Thus there is a need in the art for a method and apparatus for detecting erroneous words or phrases, so such words can be ignored. By ignoring erroneous words, the text quality increases, as well as the quality of text mining deductions.

SUMMARY

A method and apparatus for enhancing analysis of the results of speech recognition. In some embodiments, the method and apparatus are functional in assessing the correctness or confidence in speech recognition results, and in assessing the importance or significance of key phrases detected in recognized speech.

In one embodiment of the disclosure there is thus provided a method for enhancing the analysis of one or more test words extracted from a test audio source, the test audio source captured within an environment and having an acoustic environment, the method comprising: a receiving step for receiving one or more training words extracted from a training audio source; a first feature extraction step for extracting a first feature from each training word, from the environment, or from the acoustic environment; a second receiving step for receiving an indication whether training words appears in the training audio source; and a model generation step for generating a model using the training words and the first features, and the indication; a third receiving step for receiving one or more test words extracted from the test audio source; a second feature extraction step for extracting second features from the test audio source, from the environment or from the acoustic environment; and a classification step for applying the word training model on the test words and the second features, thus obtaining a confidence score for the test words. The method optionally comprises a first text extraction step for extracting the training words from the training audio source, or a second text extraction step for extracting the test word from the test audio source. The method optionally comprises a natural language processing step for analyzing the test words or the training words. Within the method, the natural language processing step optionally comprises part of speech analysis step for tagging test words or training words into a part of speech, or a stemming step for stemming the test words or the training words. Within the method, the first features optionally relate to a second audio source. Within the method, the first feature extraction step or the second feature extraction step optionally comprise extracting one or more items selected from the group consisting of: an acoustic feature; phonetic data; computer telephony integration information; number of characters of the test word or training word; frequency of the test word or training word; accumulated frequency of the test word or training word in multiple audio sources; text length; word stem; phonemes that construct the test word or training word; adjacent words; speech to text certainty; relative position of the test word in the test audio source; relative position of the training word in the test audio source; speaker side in which the test word or training word is said; part of speech of the test word or training word; part of speech of adjacent words; emotional level of the test word or training word; overlap of the test word or training word with talkover; laughter or another emotion expression; conversational data, textual data, and linguistic features. Within the method, the indication optionally comprises transcription of the training audio source or part thereof, or an indication whether the training word was said within the training audio source or not. The method optionally comprises a phonetic search step for searching for the test word within the test audio source. The method optionally comprises the steps of: a first key phrase extraction step for extracting a training key phrase form the training data according to a linguistic rule; receiving tagging information relating to a significance level or an importance level of the training key phrase; a key phrase model generation step for generating a key phrase training model between the training key phrase and the at least one first feature, and the tagging; a second key phrase extraction step for extracting a test key phrase from the test word according to the linguistic rule; and applying the key phrase training model on the test key phrase and the at least one second feature, thus obtaining an importance indication for the test key phrase.

In another embodiment of the disclosure there is thus provided a method for enhancing the analysis of one or more test words extracted from a test audio source, the method operating within an environment having an acoustic environment, the method comprising the steps of: a first receiving step for receiving one or more training words extracted from a training audio source; a first key phrase extraction step for extracting a training key phrase from the training words according to a linguistic rule; a first feature extraction step for extracting one or more first features from each of the training words, from the environment, or from the acoustic environment; a second receiving step for receiving tagging information relating to a significance level or an importance level of the training key phrase; a key phrase model generation step for generating a key phrase training model based on the training key phrase and the first feature, and the tagging; a third receiving step for receiving one or more test words extracted from a test audio source; a second key phrase extraction step for extracting a test key phrase from the test words according to the linguistic rule; a second feature extraction step for extracting a second feature from the key phrase, from the environment, or from the acoustic environment; and applying the key phrase training model on the test key phrase and the second feature, thus obtaining an importance indication for the test key phrase. The method can further comprise a first text extraction step for extracting the training words from the training audio source, or a second text extraction step for extracting the test word from the test audio source. The method optionally comprises a natural language processing step for analyzing the test words or the training words. Within the method, the natural language processing step optionally comprises part of speech analysis step for tagging the test words or the training words into a part of speech, or a stemming step for stemming the test words or the training words. Within the method, the first feature optionally relates to a second audio source. Within the method, the first feature extraction step or the second feature extraction step optionally comprise extracting one or more items selected from the group consisting of: number of tokens in the test key phrase or in the training key phrase; number of characters of a word in the test key phrase or in the training key phrase; test key phrase or training key phrase frequency within the test audio source or training audio source; total text length; word stems of words comprised in the test key phrase or in the training key phrase; phonemes comprised in a word in the test key phrase or in the training key phrase; adjacent words to the test key phrase or to the training key phrase; average speech-to-text certainty of words in the test key phrase or in the training key phrase; relative position of a first instance of the test key phrase or the training key phrase within the extracted text; speaker side; part of speech of a word of the test key phrase or the training key phrase; part of speech of adjacent words to a word of the test key phrase or the training key phrase; emotion degree within a word of the test key phrase or the training key phrase; and overlap with talkover or laughter indications. Within the method, the indication optionally comprises indication whether the at least one training word was said within the training audio source or not.

Yet another aspect of the disclosure relates to an apparatus for enhancing the analysis of a test word extracted from a test audio source, the test audio source captured within an environment and having an acoustic environment, the apparatus comprising: an extraction engine for extracting one or more features from the test audio source or from a training audio source; a training engine for receiving an indication and generating a word training model between training words and the features, and the indication; and a classification engine for applying the word training model on the test word and the features, thus obtaining a confidence score for the test word. The apparatus can further comprise a speech to text engine for extracting the test word or the training word from the test audio source or from a training audio source. The apparatus can further comprise a natural language processing engine for analyzing the test word or the training word. Within the apparatus, the natural language processing engine optionally comprises a part of speech analysis engine for tagging the test word or the training word into a part of speech, or a stemming engine for stemming the test word or the training word. Within the apparatus the features optionally relate to a second audio source. Within the apparatus, the extraction engine optionally extracts one or more items selected from the group consisting of: an acoustic feature; phonetic data; computer telephony integration information; number of characters of the test word or training word; frequency of the test word or training word; accumulated frequency of the test word or training word in multiple audio sources; text length; word stem; phonemes that construct the test word or training word; adjacent words; speech to text certainty; relative position of the test word in the test audio source, relative position of the training word in the test audio source: speaker side in which the test word or training word is said; part of speech of the test word or training word; part of speech of adjacent words; emotional level of the test word or training word; overlap of the test word or training word with talkover; laughter or another emotion expression; conversational data; textual data; and linguistic features. Within the apparatus, the indication optionally comprises transcription of the audio source or part thereof, or an indication whether the at least one training word was said within the audio source or not. The apparatus can further comprise a key phrase extraction component for extracting a training key phrase from the at least one training word and a test key phrase from the at least one test word according to a linguistic rule, wherein the training engine further receives key phrase indications and generates a key phrase training model between the training key phrase and the at least one feature, and the indication, and wherein the classification engine applies the key phrase training model on the test key phrase and the at least one feature, thus obtaining an importance indication for the test key phrase. Within the apparatus, the indication indicates whether the at least one training word was said within the audio source. The apparatus can further comprise a capturing or logging component for capturing the audio source and a storage component for storing the audio source or the at least one test word or the at least one training word or a test key phrase or a training key phrase or the test word model or key phrase model.

Yet another aspect of the disclosure relates to an apparatus for enhancing the analysis of one or more test words extracted from a test audio source, the test audio source captured within an environment and having an acoustic environment, the apparatus comprising: a key phrase extraction component for extracting a training key phrase from training words extracted from a training audio source, and a test key phrase from the test words according to a linguistic rule, an extraction engine for extracting one or more features from the test audio source or from a training audio source: a key phrase training component for receiving indications and generating a key phrase training model between the training key phrase and the features, and an indication; and a classification engine for applying the key phrase training model on the test key phrase and the features, thus obtaining an importance score for the test key phrase. The apparatus can further comprise a speech to text engine for extracting the test words or the training words from the test audio source or from a training audio source. The apparatus can further comprise a natural language processing engine for analyzing the test words or the training words or the test key phrase or the training key phrase. Within the apparatus, the natural language processing engine optionally comprises a part of speech analysis engine for tagging the test word or the training word into a part of speech, or a stemming engine for stemming the test word or the training word. Within the apparatus the features optionally relate to a second audio source. Within the apparatus, the extraction engine optionally extracts one or more items selected from the group consisting of: number of tokens in the test key phrase or the training key phrase; number of characters of a word in the test key phrase or the training key phrase; word frequency within the test audio source or training audio source; text length; word stems of words comprised in the test key phrase or the training key phrase; phonemes comprised in a word in the test key phrase or the training key phrase; adjacent words to the test key phrase or the training key phrase; average speech-to-text certainty of word in the test key phrase or the training key phrase; relative position of a first instance of the test key phrase or the training key phrase within the extracted text; speaker side; part of speech of a word of the test key phrase or the training key phrase; part of speech of adjacent words to a word of the test key phrase or the training key phrase; emotion degree within a word of the test key phrase or the training key phrase; and overlap with talkover or laughter indications. Within the apparatus, the indication optionally indicates to what extent the training key phrase is important or significant, and wherein the training engine further receives key phrase indications and generates a key phrase training model between the training key phrase and the features, and the indication, and wherein the classification engine applies the key phrase training model on the test key phrase and the features, thus obtaining an importance indication for the test key phrase. The apparatus can further comprise a capturing or logging component for capturing the audio source and a storage component for storing the audio source or the test words or the training words or a test key phrase or a training key phrase or the key phrase model or the test word model.

Yet another aspect relates to a computer readable storage medium containing a set of instructions for a general purpose computer, the set of instructions comprising: receiving one or more training words extracted from a training audio source captured within an environment and having acoustic environment; a first feature extraction step for extracting first features from each of the training words, from the environment, or from the acoustic environment; receiving an indication whether the training words appear in the training audio source; and a model generation step for generating a model using the training words and the first features, and the indication; receiving one or more test words extracted from a test audio source; a second feature extraction step for extracting one or more second features from the test audio source or from an environment or from an acoustic environment of the test audio source; and a classification step for applying the word training model on the test words and the second features, thus obtaining confidence scores for the test words.

Yet another aspect of the disclosure relates to a computer readable storage medium containing a set of instructions for a general purpose computer, the set of instructions comprising: receiving one or more training words extracted from a training audio source captured within an environment and having an acoustic environment; a first key phrase extraction step for extracting a training key phrase from the training words according to a linguistic rule; a first feature extraction step for extracting one or more first features from each of the training words, from the environment, or from the acoustic environment; receiving tagging information relating to a significance level or an importance level of the training key phrase; a key phrase model generation step for generating a key phrase training model based on the training key phrase and the first features, and the tagging; receiving one or more test words extracted from a test audio source captured within an environment and having acoustic environment; a second key phrase extraction step for extracting a test key phrase from the test words according to the linguistic rule; a second feature extraction step for extracting one or more second features from each of the test key phrases, from the environment, or from the acoustic environment; and applying the key phrase training model on the test key phrase and the second features, thus obtaining an importance indication for the test key phrase.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are designated by the same numerals or letters.

DETAILED DESCRIPTION

An apparatus and methods for enhancing the results of speech to text (STT) engines operating on audio sources such as files or streams. In accordance with preferred embodiments of the disclosure, a training step is performed, in which multiple features are determined or extracted from an audio source in which words were found and from the environment and acoustic environment. Determination relates to deciding which features will be used, and extraction relates to determining the specific value of each feature.

The features may include acoustic features, word-related features, environmental features, or the like. In addition, manual transcription or an indication to particular words spotted in the audio source is provided for the same audio files or streams. Alternatively, a label, i.e. a correctness indication is provided for each found word whether it indeed exists in the audio. A model is then trained on the set of feature vectors and their corresponding labels. After the training step is completed, during on-going usage, also referred to as a testing step or production stage, the features are extracted for each found word, followed by the determination of a confidence score, according to the model. The confidence score is then used for determining whether the found word is correct or incorrect. If the indication is incorrect the word is preferably ignored.

Another embodiment of the disclosure relates to key phrases, in which similar training and testing, i.e. production stages are used. Key phrases are located in a text that has been extracted from an audio source, according to a set of linguistic rules, and additional or alternative features are determined for the key phrases. In addition, a correct/incorrect manual indication, a meaningful/meaningless or important/not-important manual indication is provided for each key phrase. Again, the training data is used to train a model. Each example in the training data consists of a pair of a feature vector that represents a single key phrase, and its class label or correctness indication. In production time, the model is used for determining which sequences identified as key phrases are meaningful or important. Meaningful key phrases can be used for further processing such as call summarization, call categorization, call collection topic analysis, call collection link analysis, escalation of an interaction in which certain key phrases were detected to a particular person or team, or the like.

Figure 1:
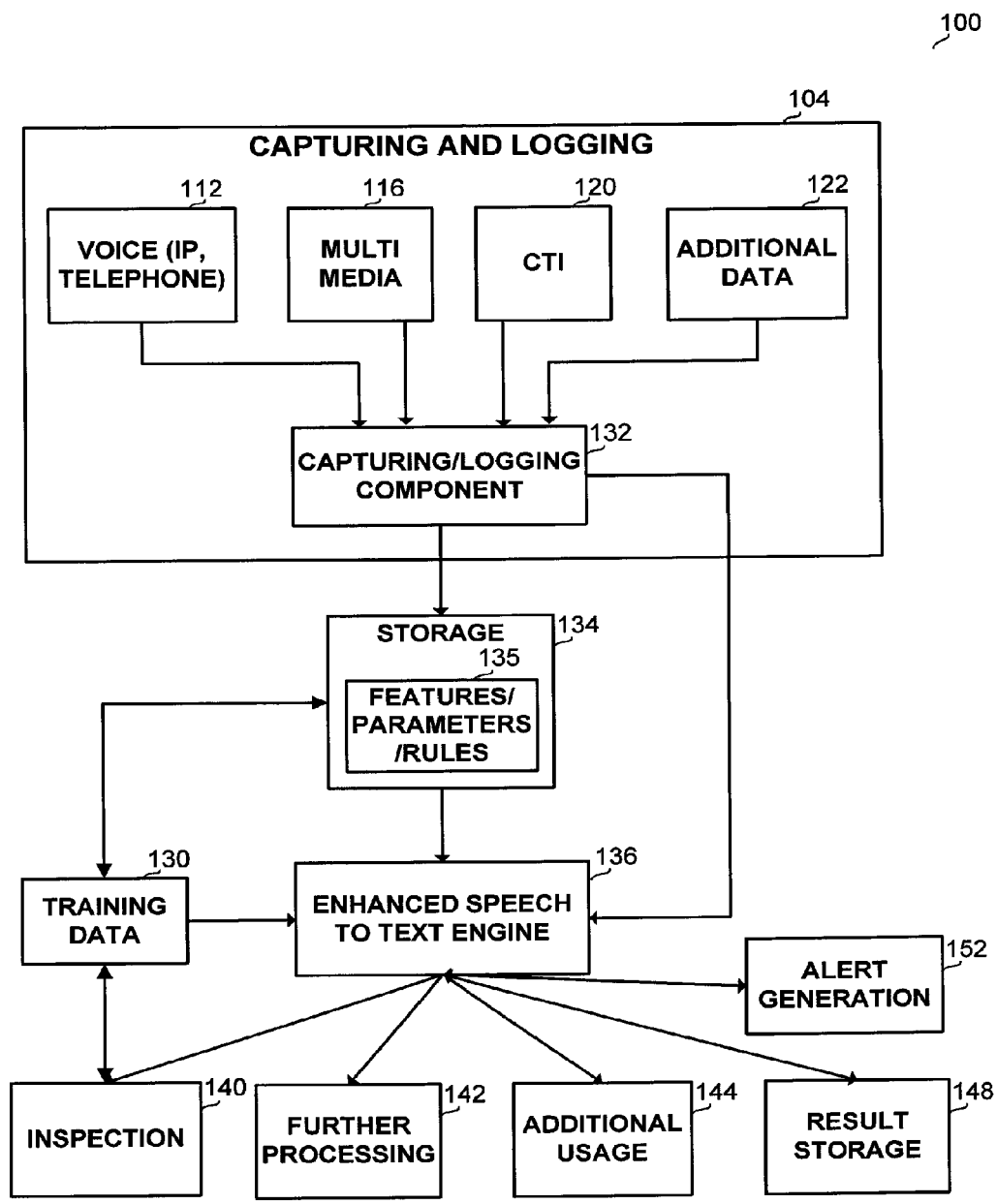
FIG. 1 is a schematic illustration of typical environment in which the disclosed invention is used.

Referring now to FIG. 1, showing a block diagram of the main components in a typical environment in which the disclosed invention is used. The environment, generally referenced as 100, is an interaction-rich organization, typically a call center of a financial institute such as a bank, a trading floor, or an insurance company, a public safety contact center, a communications service provider contact center, customer service outsourcing center or the like. Interactions with customers, users, leads, employees, business partners, or other contacts are captured, thus generating input information of various types. Each organization may comprise one or more sites, i.e. geographic locations in which interactions are handled. The information types include vocal interactions, interactions comprising a vocal component, non-vocal interactions, organizational data and additional data. Interactions comprising a vocal component optionally include telephone calls 112, made using any device, such as a landline phone or a cellular phone, and transmitted using any technology, such as analog lines, voice over IP (VoIP) or others. The capturing of voice interactions can employ many forms and technologies, including trunk side, extension side, summed audio, separate audio, various encoding and decoding protocols such as G729, G726, G723.1, and the like. The voice typically passes through a PABX (not shown), which in addition to the voice of the two or more sides participating in the interaction, collects additional information discussed below. The interactions can further include face-to-face interactions, such as those recorded in a walk-in-center, and additional sources of vocal data, such as microphone, intercom, the audio part of a video capturing such as a video conference, vocal input by external systems or any other source. Another source of collected information includes multi media information 116, which comprises interactions or parts thereof, such as video conferences, e-mails, chats, screen events including text entered by the agent, buttons pressed, field value change, mouse clicks, windows opened or closed, links to additional interactions in which one of the participants in the current interaction participated, or any other information relevant to the interaction or to the participants, which may reside within other applications or databases. In addition, the environment receives Computer Telephony Integration (CTI) and PABX information 120, including start and end time, ring time, hold time, queue time, call wrap up time, number of participants, stages (i.e. segments of the call during which the speakers do not change), hold time, abandon from hold, hang-up side, abandon from queue, number and length of hold periods, transfer events, number called, number called from, DNIS, VDN, ANI, or the like.

Data from all the above-mentioned sources and others (e.g. additional data 122) is captured and preferably logged by capturing/logging unit 132. Capturing/logging unit 132 comprises a computing platform running one or more computer applications as is detailed below. The captured data is optionally stored in storage 134, which is preferably a mass storage device, for example an optical storage device such as a CD, a DVD, or a laser disk; a magnetic storage device such as a tape or a hard disk; a semiconductor storage device such as Flash device, memory stick, or the like. The storage can be common or separate for different types of captured interactions and different types of additional data. Alternatively, the storage can be remote from the site of capturing and can serve one or more sites of a multi-site organization. Storage 134 further optionally stores features, parameters and rules 135, describing the features or measures to be extracted or evaluated from audio files, text files, environmental parameters, manually entered parameters or others. The data, features, parameters, or rules are transferred from storage 134 or directly from capturing/logging unit 132 without being stored, to an enhanced speech to text (STT) engine 136 which transcribes or spots the words, and enhances the results using the methods detailed below. Engine 136 preferably receives training data 130 comprising data generated or received during training of the system. Training data 130 is optionally stored in storage 134, or in any other storage. The output of engine 136, comprising text extracted from audio after enhancement, optionally undergoes inspection, including manual or automatic inspection by inspection component 140, the output of which is optionally used as feedback for enhancing training data 130. The output of engine 136 can also be forwarded to further processing components 142 for additional processing, such as text analysis, text mining, natural language processing, categorization, classification, root cause analysis or the like. The output can be further directed to additional usage components 144 intended for any other purpose, such as reporting, Automatic Call Distribution (ACD), input to service, marketing, or product departments, or other systems and purposes. The output is optionally transferred also to result storage 148, which can be a part of storage 134 or separate, or to alert generation component 152. The alert can take any form, such as transferring a call, providing an on-screen alert, sending an e-mail, fax, SMS, telephone message or others to a person in charge, updating a database or other actions. The alert can be generated if a particular word or key phrase was found, if enhancing the text provides exceptional results, in which case it may be required to repeat training, or the like.

All components of the system, including capturing/logging components 132, engine 136, further processing components 142, alert generation component 152 and others are preferably implemented as one or more applications executed on one or more computing platforms, such as a personal computer, a mainframe computer, or any other type of computing platform provisioned with a memory device (not shown), a Central Processing Unit (CPU) or microprocessor device, and several I/O ports (not shown). Each application is a set of logically interrelated computer programs, modules, or other units and associated data structures that interact to perform one or more specific tasks. All applications can be co-located and run on the same one or more computing platform, or on different platforms, optionally located in different geographic locations. Alternatively the components are implemented as firmware ported for a specific processor such as digital signal processor (DSP) or microcontrollers, or can be implemented as hardware or configurable hardware such as field programmable gate array (FPGA) or application specific integrated circuit (ASIC).

Figure 2:
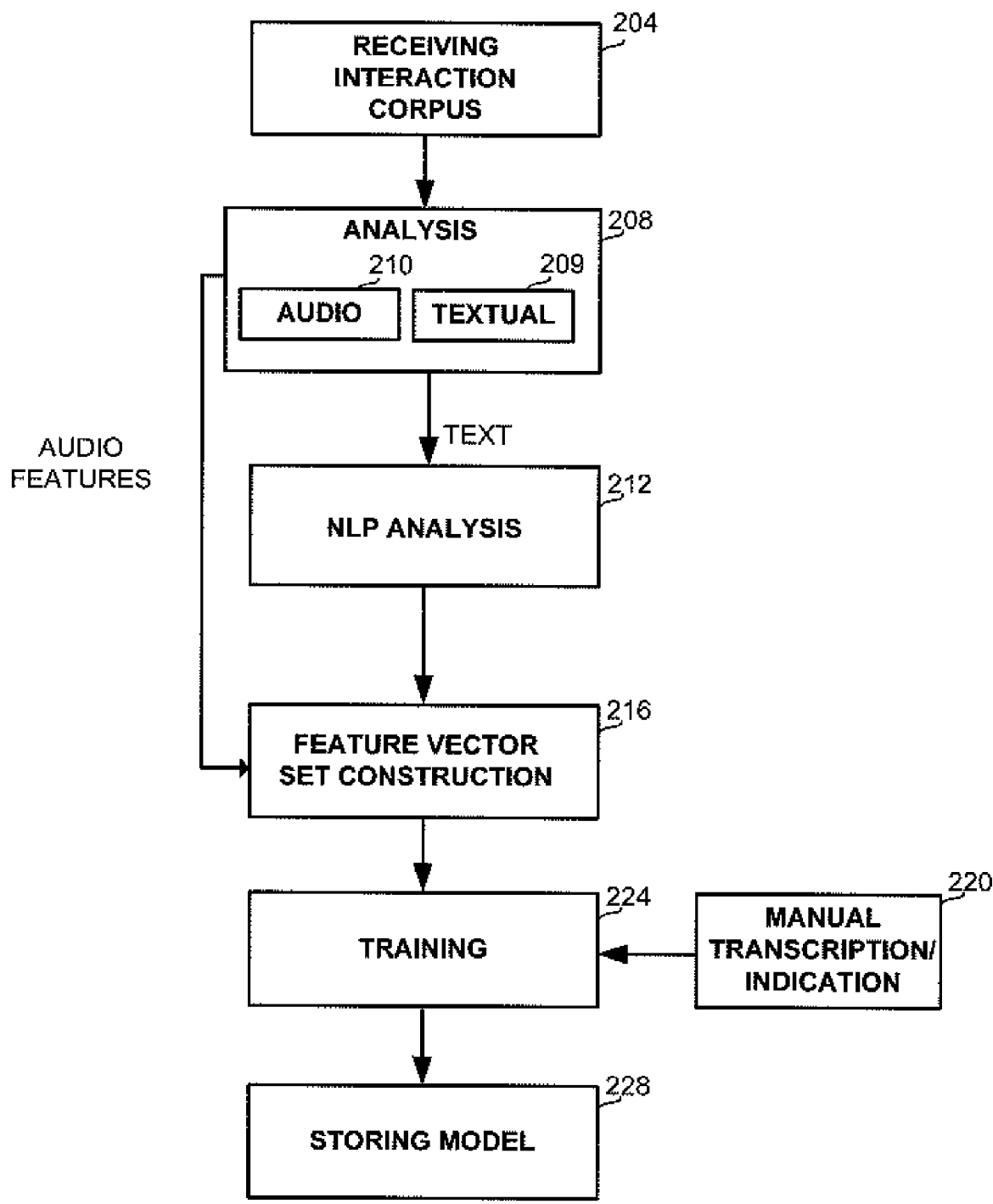
FIG. 2 is a flowchart of the main steps in training a model for enhancing speech to text results, in accordance with a preferred implementation of the disclosure.

Referring now to FIG. 2, showing a flowchart of the main steps in training a model for enhancing STT results. Training is performed on a training audio source. On step 204 a corpus comprising one or more training audio files or streams is received by a training system, for example from the captured or logged interactions detailed in association with FIG. 1 above. The files or streams can be in any supported format, compression, of any required quantity or length, and the like. On step 208 the audio files or streams undergo analysis by relevant engines. Substep 209 comprises text extraction by text-related analysis, such as STT or word spotting, or otherwise receiving text extracted from the audio files. During step 209 training words are extracted. Step 209 can be performed using proprietary tools, or third party tools, such as Dragon NaturallySpeaking manufactured by Nuance. Substep 210 comprises additional analysis for extracting acoustic or other parameters, such as emotion analysis; call flow analysis, talk analysis, and others. Some types of analysis can be associated with step 209 or with step 210, for example laughter detection, certain types of emotion analysis and others.

On step 212 the texts generated on step 209 undergo Natural Language Processing (NLP), which includes for instance Parts of Speech (POS) tagging, and stemming, i.e. detecting the base form of each word, typically a singular and present form. Step 212 can be performed using proprietary tools, or any other external or commercial tools, such as Linguistx-Platform™ manufactured by Inxight. The POS tagging is preferably performed based on the definition as well as on the context of words, and serves for reducing ambiguity of words within the context. The tags may include a verb, a noun (singular), a noun (plural), a pronoun, a preposition, an adverb, an adjective, or others.

On step 216, a set of feature vectors is constructed, each vector characterizing a training word spotted in the audio source. Preferably, features are extracted not only from or relating to the current audio source such as the current interaction, but also from additional sources, in order to better characterize the word. The specific set of features extracted and referred to may change according to the environment, complexity issues, available processing power or other factors. The features may include acoustic features extracted on step 210, as well as additional ones. The features optionally include, but are not limited to any one or more of the following: number of characters; word frequency in the current interaction; accumulated word frequency in multiple interactions; text length; word stem; phonemes that construct the word; adjacent words; STT certainty; the relative position of the first instance of the word in the current interaction; speaker side (agent/customer) in case of unsummed interactions, part of speech of the word; part of speech of adjacent words; emotional level of the word; overlap is with talkover, laughter or another emotion expression, acoustic data, conversational data, textual data, or linguistic features. The set of features can be designed to include the word itself, or not to include the word but only other characteristics thereof. On step 220 an indication for the correctness of the words is received. In one embodiment, the source comprises a correct/incorrect indication for each word spotted or found in the transcription. Alternatively, a full transcription or all the words expected to be spotted are provided, upon which a correct/incorrect indication is determined.

On step 224 a model is trained, based upon the input training data which consist of a set of pairs, each pair comprising a feature vector constructed in step 216 and a corresponding correctness indication extracted from the manual transcription or received explicitly by manual tagging or by any other source of information on step 220. Training is preferably performed using methods such as Neural networks, Support Vector Machines (SVM) as described for example in. "An Introduction to Support Vector Machines and other kernel-based learning methods" by Nello Cristianini and John Shawe-Taylor, Cambridge University Press, 2000, ISBN 0-521-78019-5, incorporated herein by reference, or other methods. Later, at production stage, as discussed in detail in association with FIG. 3 below, the model is used to predict the correctness of words retrieved from audio for which no manual transcription is available. The model will then provide an indication to whether the particular word is correct, i.e. appears in the audio, or not.

The required corpus size generally depends on the training method employed. Some training methods are accumulative, i.e. their results can be enhanced when new data is collected, while others may require receiving all the corpus a-priori.

It will be appreciated that as an alternative indication received on step 220, it is sufficient to provide as input to training step 224 a correct/incorrect indication for each word found on step 209. An explicit correctness indication saves the need to compare between the words and the transcription.

On step 228, the word training model, i.e., the statistical information yielded from training step 224, comprising the set of the training examples, and possibly additional relevant data are preferably stored in a storage device, such as storage 134 of FIG. 1.

Figure 3:
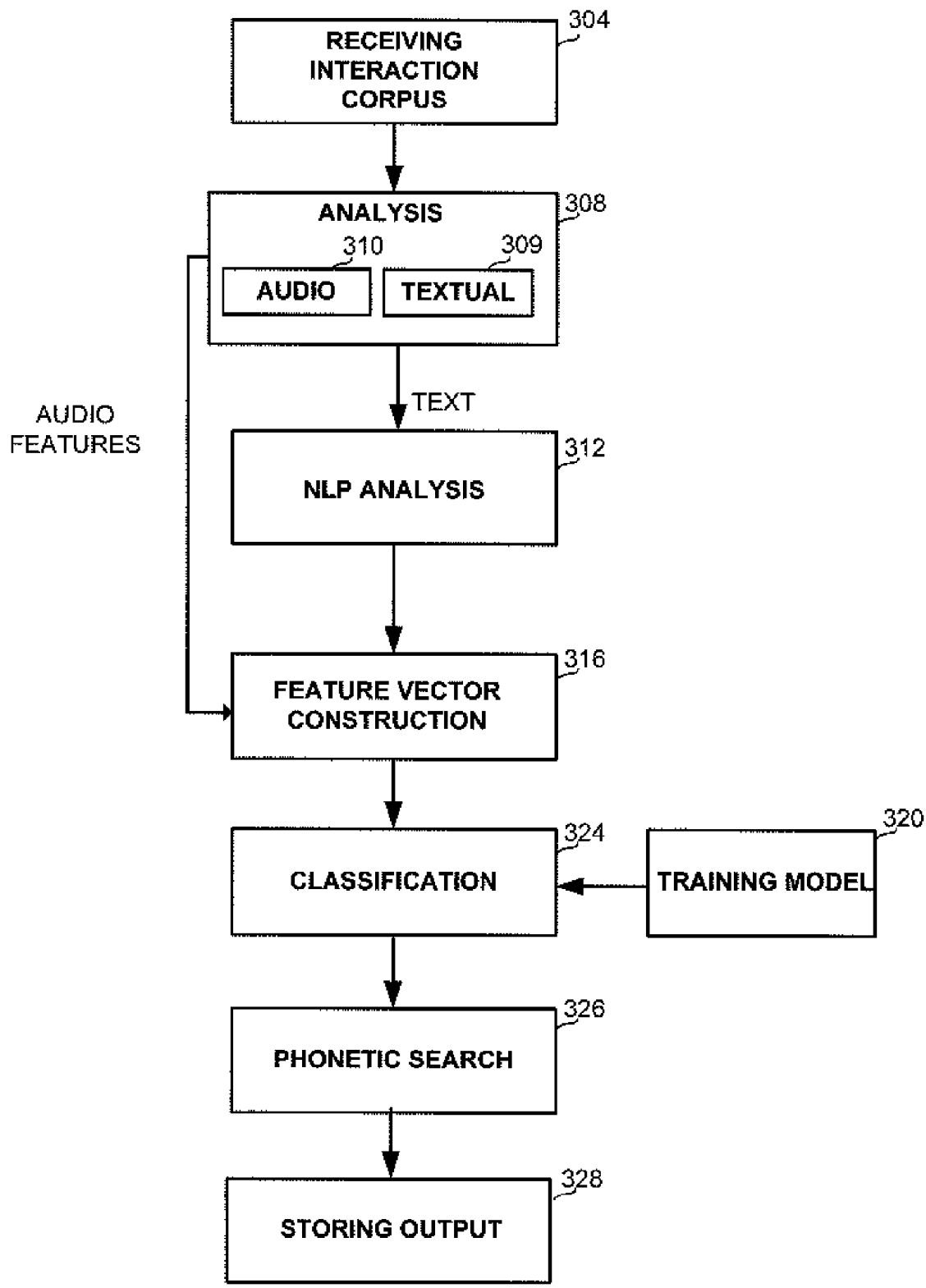
FIG. 3 is a flowchart of the main steps in enhancing speech to text results, in accordance with a preferred implementation of the disclosure.

Referring now to FIG. 3, showing a flowchart of the main steps in enhancing speech to text results, once training is completed. On step 304 the corpus comprising one or more test audio sources is received. The corpus can comprise one or more audio files or streams. In preferred implementations, during enhancing, one audio source is processed at a time, so it is not required to accumulate a large corpus, but rather each audio can be processed in real-time, near real-time or at any other time after it is captured. On step 308 the audio is analyzed, comprising text analysis on step 309 for extracting test words, similarly to step 209 of FIG. 2 detailed above, and step 310 for acoustic analysis similarly to step 210 of FIG. 2 detailed above. On step 312 the resulting text undergoes NLP analysis, including stemming and POS tagging similarly to step 212 of FIG. 2 detailed above.

On step 316 a feature vector is constructed for each input word found in the audio source, the feature vector characterizing the word. The feature vector comprises audio features extracted on step 308 or textual or linguistic features extracted on step 312.

On step 320, the word training model generated on step 224 above and stored on step 228 above is retrieved and on classification step 324 the model is used to predict the confidence score or correctness estimation for each word represented as a feature vector on step 316. The result of step 324 is thus a confidence score indicating the confidence in the spotted word, a correctness indication, or any value indicating correctness level. A user can set a threshold, such that words having correctness indication beyond a predetermined threshold are accepted, while others are rejected. If the output is a correct/incorrect indication, then preferably words indicated as incorrect are rejected, while others are accepted.

On optional step 326, the test audio undergoes phonetic search for the particular words found on step 309. Phonetic search preferably splits the words into the phonemes they are made of, and searches for the phoneme sequence within the audio. Phonetic search can provide further indication to the existence of the words within the audio, and can be used to enhance the correctness indication. For example, a numeric correctness indication which is close to the threshold can be regarded as correct if phonetic search ascertains the existence of the words, and incorrect otherwise. The phonetic search can thus be performed for words having inconclusive correctness indication. Alternatively, the phonetic search can be performed for all words as part of step 310. On step 328 the classification results are optionally stored in storage such as 134 of FIG. 1.

Another aspect of the disclosure relates to key phrases appearing in the text. Key phrases are generally combinations of one or more words which are logically related, whether linguistically or in the context of the environment. Such key phrases first have to be identified. The questions relevant to key phrases are their correctness, similarly to the word correctness disclosed above, and their importance or significance. Similar methods to the methods described above are provided for phrases, with additional steps relating to determining the importance or significance of key phrases.

Figure 4:
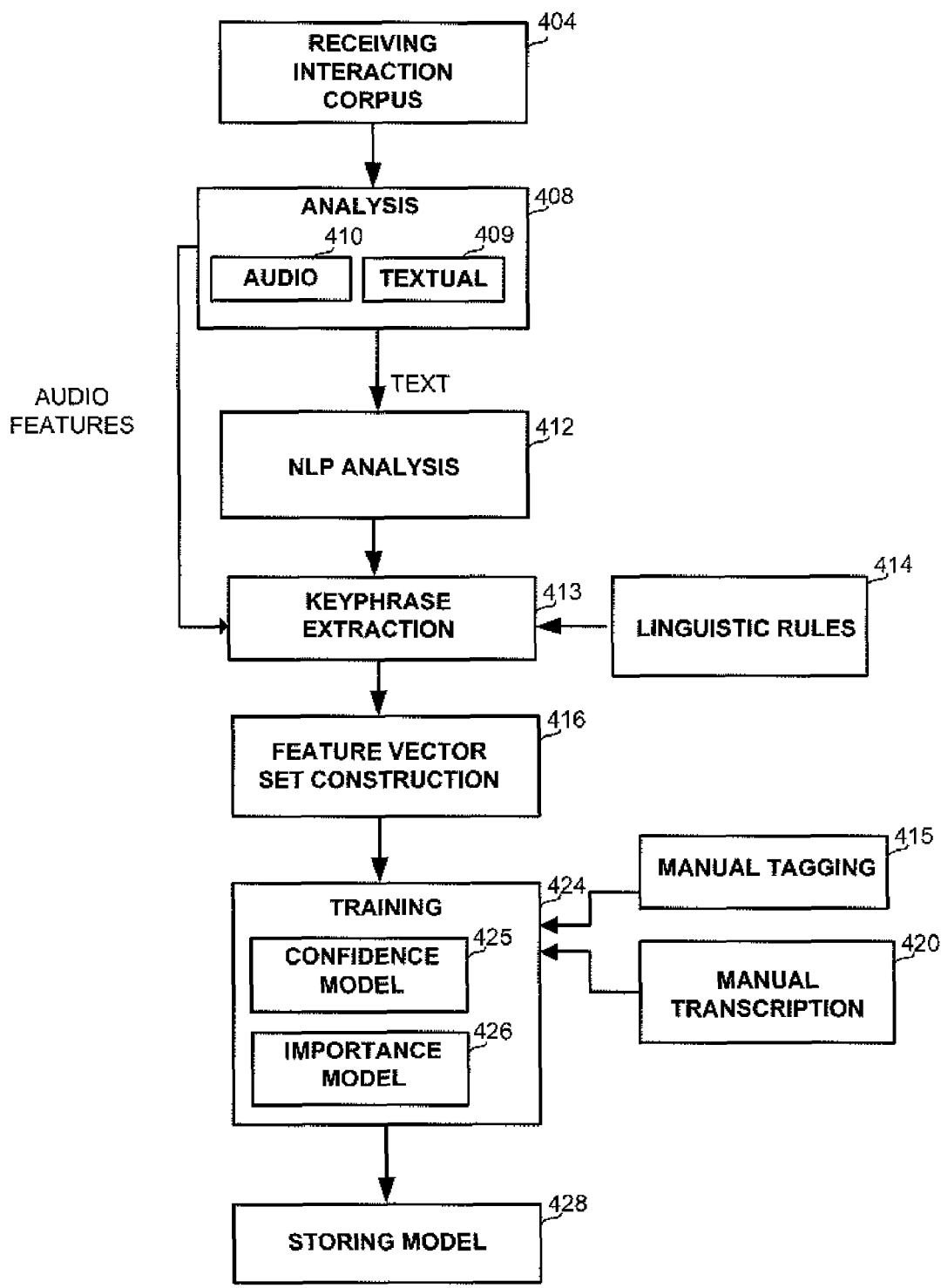
FIG. 4 is a flowchart of the main steps in training a model for enhanced key phrase recognition and importance testing, in accordance with a preferred implementation of the disclosure.

Referring now to FIG. 4 showing a flowchart of the main steps in training a model for enhanced key phrase recognition and importance testing. The method is similar to the method detailed in association with FIG. 2 above. The interaction corpus is received on step 404. An analysis step 408 includes a textual extraction step 409 and an audio extraction step 410. Training words are extracted on textual extraction step 409 whether by speech to text, word spotting or otherwise receiving text extracted from the audio files, and acoustic features are extracted on step 410. On step 412 the text undergoes NLP analysis, including for example POS tagging and stemming. On step 413 training key phrases are extracted from the text. The training key phrases are extracted according to linguistic rules 414, which indicate combinations having high likelihood of being key phrases. The rules are preferably expressed as a collection of one or more ordered sequences of parts of speech, and negation thereof. For example, "Neg?verb_[determiner|preposition|conjunction)_(noun|proper)?" will identify word combinations such as "have this printer", "not have this printer" and others. Expressions can be expressed using the ordinary symbols of regular expressions, such as '?' for optional, '|' for or, '*' for any number of instances, and the like. Locating key phrases within the text is done by matching the text with the regular expressions, using the POS tagging performed on step 412. Additional examples for linguistic rules may include any one or more of the following:

(Aux)?(Neg_)?(Adverb_)?Verb(_Adverb)?
    (Neg_)?Noun
    (Neg_)?(Adverb_)?(Adjective_)?Adjective
    (Neg_)?Proper
    (Neg_)?Noun_
((Determine|Preposition|Conjunction|Part-Poss)_)?Noun
    (Neg_)?Verb_(Part-Inf_)?Verb
    (Neg_)?(Adjective_)?Adjective_(Noun|Proper)(_(Noun|Proper))?
    (Neg_)?(Adjective_)?Noun_((Part-Inf|V-PrPart)_)?Verb(_Noun)?
    (Neg_)?Proper_((Determiner|Preposition|Conjunction)_)?(Proper|Noun)
    (Neg_)?Number_((Determine|Preposition|Conjunction)|)?Noun
    (Neg_)?Proper_(Proper|Noun)_(Proper|Noun)
    (Neg_)?(Adjective_)?Proper_(Part-Inf_)?Verb
    (Neg_)?Noun(Adjective|Noun)_Noun
    (Neg_)?Adjective_(Part-Inf_)?Verb
    (Neg_)?Adverb_Adjective_Noun
    (Neg_)?Verb_Noun_Noun
    (Neg_)?Proper_Adjective_Noun
    (Neg_)?Adjective_Number_Noun
    (Neg_)?Adjective_Verb_Noun On step 416 a set of feature vectors is constructed as described in association with step 216 of FIG. 2 above. However, since key phrases are also extracted and not just unigrams (single words), additional features may be suggested, including but not limited to, for example any subset of the following: the number of tokens (words) in the key phrase; the number of characters of the first word in the key phrase; the number of characters of the last word in the key phrase; word frequency in the current interaction; key phrase frequency in the current interaction; text length; word stems of the words comprised in the key phrase; phonemes comprised in the word; adjacent words; average STT certainty of the words in the key phrase; the relative position of the first instance of the key phrase within the current interaction; speaker side (agent/customer) in case of unsummed interactions; part of speech of the words that construct the key phrase; part of speech of the adjacent words; emotion degree of the word; and overlap with talkover or laughter indications. The features may also relate to words or key phrases within the whole corpus and not within a single interaction, such as key phrase frequency in the whole corpus.

On step 424 training is performed for generating key phrase confidence or correctness model 425 and key phrase importance model 426, which preferably include pairs, each pair consisting of a feature vector representation and an indication. Key phrase confidence or correctness model 425 relates to the confidence or the correctness of words and word combinations using manual transcription 420. Generating the key phrase confidence or correctness model is performed similarly to step 224 of FIG. 2. However, the model may be more complex, since there are also cases relating to partial recognition of a key phrase. Instead of manual transcription, which requires further generation of a confidence or correctness indication for each word, such indication may be provided instead of the transcription. Key phrase importance model 426 relates to the importance or significance of the detected key phrases. On step 416 each key phrase is represented as a feature vector for further processing in training step 424. On step 424 manual indication 415 is received, in which each key phrase is tagged as important or unimportant. Training step 424 performs generalization on the training data consisting of pairs of feature vectors and importance indications. The training is preferably performed by applying statistical analysis or other methods in order to create a model that is able to predict the most likely label for unseen instances. On step 428 the word training model and key phrase training model are stored as described in association with step 228 above.

Figure 5:
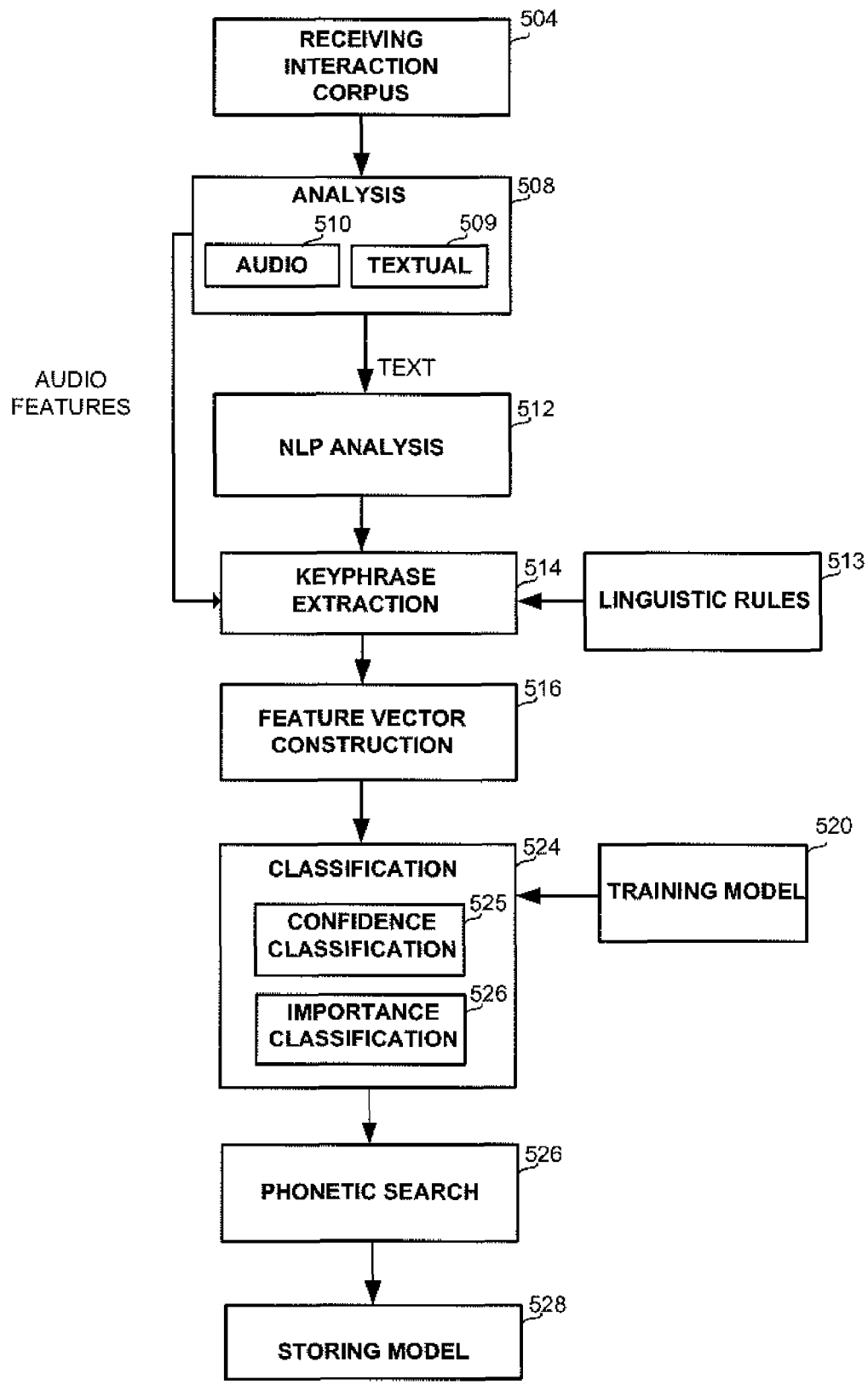
FIG. 5 is a flowchart of the main steps enhancing key phrases identification and importance estimation, in accordance with a preferred implementation of the disclosure.

Referring now to FIG. 5, showing a flowchart of the main steps in a method for key phrases identification and importance estimation. The method is substantially similar to the method detailed in association with FIG. 3 above. On step 504 the test interaction corpus is received. An analysis step 508 includes a textual extraction step 509 and an audio extraction step 510. Step 509 performs text-related analysis and step 510 performs acoustic-related parameters extraction. On step 512 NLP analysis takes place, preferably including stemming and POS tagging. On step 514 key phrases are extracted from the text output of step 509, in a similar manner to key phrase extraction step 513 of FIG. 4. Step 513 uses a set of linguistic rules 514 for identifying potential key phrases. On step 516 features are extracted similarly to step 316 of FIG. 3.

On step 524, classification is performed, similarly to step 324 of FIG. 3. However, on step 524 in addition to determining a confidence or correctness indication for words, confidence or correctness indication can also be determined relating to key phrases, generated for example by averaging the confidence or correctness score of all words, taking the minimal or maximal confidence or correctness scores of all words, or any other scheme. In addition, an importance estimation or indication is determined for each key phrase. Thus, classification step 524 preferably comprises confidence classification step 525 performed using key phrase confidence model 425, and importance classification step 526 using key phrase importance model 426 of FIG. 4.

On optional step 526 phonetic search is performed for searching for the test key phrases within the audio input, thus enhancing the correctness indication as detailed in association with step 326 of FIG. 3 above. On step 528 the classification results and optionally any temporary results are stored in storage 134 of FIG. 1 or in any other storage.

Figure 6:
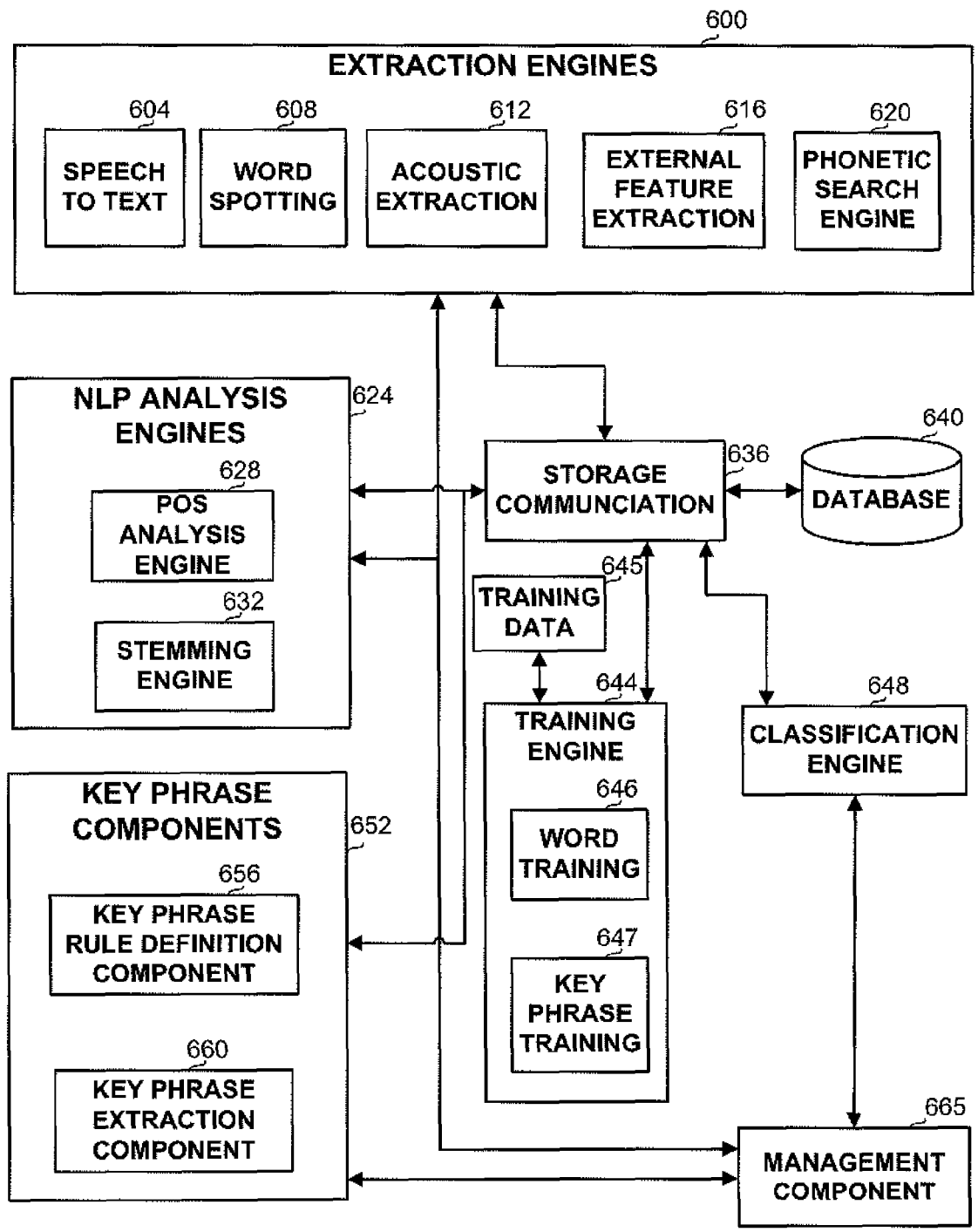
FIG. 6 is a block diagram of the main components in an enhanced speech to text apparatus, in accordance with preferred embodiments of the disclosure.

Referring now to FIG. 6, showing a block diagram of the main components in an enhanced STT apparatus. The apparatus, generally shown as engine 136 of FIG. 1 is preferably implemented as sets of computer instructions performed by computing platforms, interacting to carry out the methods of FIGS. 2, 3, 4 and 5. The apparatus generally comprises extraction engine 600, NLP analysis engines 624, key phrase handling components 652, training component 644, classification components 648, and management component 665. Extraction engines 604 comprise at least one of speech to text engine 604, word spotting engine 608 or another engine supplying text out of audio files or streams. Extraction engines 604 optionally further comprise acoustic extraction engine 612, for retrieving acoustic features from the audio input, such as talkover parameters, emotion indicators or other features; external feature extraction engine 616 for extracting parameters from external sources such as Computer Telephony Integration (CTI) equipment for example called number or calling number, organizational databases or other sources; and phonetic search engine 620 for locating sequences of phonemes within audio.

Natural Language Processing (NLP) tagging components 624 comprise Parts of Speech (POS) tagging engine 628 for assigning a part of speech indication, such as noun, verb, preposition, adverb, adjective or others to words extracted by engine 604 or engine 608. NLP analyses components 624 further comprise stemming engine 632 for reducing words to their basic form, for example "books" will be stemmed to "book", "going" will be stemmed to "go" and the like.

Key phrase components 652 comprise key phrase rule definition component 656 for defining rules for identifying key phrases, such as the rules 414 detailed in association with FIG. 4 above. Key phrase components 652 further comprise key phrase extraction component 660 for extracting keywords from the text output by engines 604 or 608 above, or the same text after being processed by NLP engines 624. The key phrases are extracted according to the rules defined using key phrase rule definition component 656.

The apparatus further comprises or is in communication with database 640 which is a possible implementation of storage 134 of FIG. 1. Database 640 optionally comprises the audio files, the results of the various analysis, the rules defined using component 652, and other data associated with the output or intermediate products of the apparatus. The apparatus further comprises storage communication component 636 through which the various engine communicate with database 640. In preferred implementations, storage communication component 636 comprises parts implemented as database 640 and parts implemented as parts of the various engines.

The apparatus further comprises training component 644 which receives training data 645. Training components 644 generate training models from a set of pairs, each pair consisting of a feature vector and an indication. Training engines 644 comprise word training component 646 for generating a model based on the output of engines 600, with the words optionally enhanced by NLP analysis components 624, and manual indications relating to the correctness of the words, or manual transcription from which the correctness or the words is deduced. Training components 644 further comprise optional phrase training component 647 for generating a model based on key phrases generated by key phrase extraction component 660 with features extracted by engine 600, and training data 645 comprising manual indications relating to the importance or significance of key phrases.

The apparatus further comprises classification component 648 for assigning, by applying the models generated by components 644, a correctness indication to each word found, and optionally an importance indication to each key phrase found in the audio input. Classification engine 648 applies the generated models to data extracted from audio files or streams, the words of which optionally processed by NLP engines 624, and key phrase extraction component 660. Data flow and timing within the apparatus is controlled by management component 665.

The methods and apparatus detailed above enable the enhancement of speech to text engines, by providing indications to the correctness of the found words, based on additional sources besides the internal indication provided by the STT engine. The enhanced indications comprise sources of data such as NLP features, acoustic features, CTI features, phonetic data and others. The apparatus and methods also enable the detection of important or significant keywords found in audio files, thus enabling more efficient usages including further processing such as enhanced information retrieval and text categorization based on correct words. Uses may include further processing such as text mining based on correct and important key phrases. The text mining may include functionalities such as automatic topic detection in a single interaction or in a collection of interactions, link analysis and the like. Further processing may also include transfer of interactions to relevant agents, escalation of issues, or the like. The method and apparatus employ a training phase in which word model and key phrase models are generated for determining an enhanced correctness indication for a word, and an enhanced importance indication for a key phrase, based on the additional features.

It will be appreciated by a person skilled in the art that multiple variations and options can be designed along the guidelines of the disclosed method.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation, material, step of component to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method for enhancing the analysis of at least one test word extracted from a test audio source, the method operating within an environment having an acoustic environment, the method comprising the steps of:
    a first receiving step for receiving on a computing platform at least one training word extracted from a training audio source;
    a first key phrase extraction step for extracting a training key phrase from the at least one training word according to a linguistic rule;
    a first feature extraction step for extracting at least one first feature from each of the at least one training word from the environment, or from the acoustic environment;
    a second receiving step for receiving tagging information relating to a significance level or an importance level of the training key phrase;

a key phrase model generation step for generating a key phrase training model based on the training key phrase and the at least one first feature, and the tagging;

a third receiving step for receiving at least one test word extracted from a test audio source;

a second key phrase extraction step for extracting a test key phrase from the at least one test word according to the linguistic rule;

a second feature extraction step for extracting at least one second feature from each of the at least one test key phrase, from the environment, or from the acoustic environment; and applying the key phrase training model on the test key phrase and the at least one second feature, thus obtaining an importance indication for the test key phrase.

2. The method of claim 1 further comprising a first text extraction step for extracting the at least one training word from the training audio source, or a second text extraction step for extracting the at least one test word from the test audio source.

3. The method of claim 1 further comprising a natural language processing step for analyzing the at least one test word or the at least one training word.

4. The method of claim 3 wherein the natural language processing step comprises part of speech analysis step for tagging the at least one test word or the at least one training word into a part of speech, or a stemming step for stemming the at least one test word or the at least one training word.

5. The method of claim 1 wherein the at least one first feature relates to a second audio source.

6. The method of claim 1 wherein the first feature extraction step or the second feature extraction step comprise extracting at least one item selected from the group consisting of: number of tokens in the test key phrase or in the training key phrase; number of characters of a word in the test key phrase or in the training key phrase; test key phrase or training key phrase frequency within the test audio source or training audio source; total text length; word stems of words comprised in the test key phrase or in the training key phrase; phonemes comprised in a word in the test key phrase or in the training key phrase; adjacent words to the test key phrase or to the training key phrase; average speech-to-text certainty of words in the test key phrase or in the training key phrase; relative position of a first instance of the test key phrase or the training key phrase within the extracted text; speaker side; part of speech of a word of the test key phrase or the training key phrase; part of speech of adjacent words to a word of the test key phrase or the training key phrase; emotion degree within a word of the test key phrase or the training key phrase; and overlap with talkover or laughter indications.

7. The method of claim 1 wherein the indication comprises indication whether the at least one training word was said within the training audio source or not.

8. An apparatus for enhancing the analysis of at least one test word extracted from a test audio source, the test audio source captured within an environment and having an acoustic environment, the apparatus comprising:

a computing platform for enhancing the analysis by executing software components;

a key phrase extraction component for extracting a training key phrase from at least one training word extracted from a training audio source, and a test key phrase from the at least one test word according to a linguistic rule, an extraction engine for extracting at least one feature from the test audio source or from a training audio source;

a key phrase training component for receiving indications and generating a key phrase training model between the training key phrase and the at least one feature, and an indication; and a classification engine for applying the key phrase training model on the test key phrase and the at least one feature, thus obtaining an importance score for the test key phrase.

9. The apparatus of claim 8 further comprising a speech to text engine for extracting the at least one test word or the at least one training word from the test audio source or from a training audio source.

10. The apparatus of claim 8 further comprising a natural language processing engine for analyzing the at least one test word or the at least one training word or the test key phrase or the training key phrase.

11. The apparatus of claim 10 wherein the natural language processing engine comprises a part of speech analysis engine for tagging the at least one test word or the at least one training word into a part of speech, or a stemming engine for stemming the test word or the training word.

12. The apparatus of claim 8 wherein the at least one feature relates to a second audio source.

13. The apparatus of claim 8 wherein the extraction engine extracts at least one item selected from the group consisting of: number of tokens in the test key phrase or the training key phrase; number of characters of a word in the test key phrase or the training key phrase; word frequency within the test audio source or training audio source; text length; word stems of words comprised in the test key phrase or the training key phrase; phonemes comprised in a word in the test key phrase or the training key phrase; adjacent words to the test key phrase or the training key phrase; average speech-to-text certainty of word in the test key phrase or the training key phrase; relative position of a first instance of the test key phrase or the training key phrase within the extracted text; speaker side; part of speech of a word of the test key phrase or the training key phrase; part of speech of adjacent words to a word of the test key phrase or the training key phrase; emotion degree within a word of the test key phrase or the training key phrase; and overlap with talkover or laughter indications.

14. The apparatus of claim 8 wherein the indication indicates to what extent the training key phrase is important or significant, and wherein the training engine further receives key phrase indications and generates a key phrase training model between the training key phrase and the at least one feature, and the indication, and wherein the classification engine applies the key phrase training model on the test key phrase and the at least one feature, thus obtaining an importance indication for the test key phrase.

15. The apparatus of claim 8 further comprising a capturing or logging component for capturing the audio source and a storage component for storing the audio source or the at least one test word or the at least one training word or a test key phrase or a training key phrase or the key phrase model or the test word and key phrase model.

16. A computer readable storage medium containing a set of instructions for a general purpose computer, the set of instructions comprising: receiving at least one training word extracted from a training audio source captured within an environment and having acoustic environment; a first key phrase extraction step for extracting a training key phrase from the at least one training word according to a linguistic rule; a first feature extraction step for extracting at least one first feature from each of the at least one training word, from the environment, or from the acoustic environment; receiving tagging information relating to a significance level or an importance level of the training key phrase; a key phrase model generation step for generating a key phrase training model based on the training key phrase and the at least one first feature, and the tagging; receiving at least one test word extracted from a test audio source captured within an environment and having acoustic environment; a second key phrase extraction step for extracting a test key phrase from the at least one test word according to the linguistic rule; a second feature extraction step for extracting at least one second feature from the test key phrase, from the environment, or from the acoustic environment; and applying the key phrase training model on the test key phrase and the at least one second feature, thus obtaining an importance indication for the test key phrase.

* * * * *